(12) United States Patent
Hammoud et al.

(10) Patent No.: US 6,390,040 B1
(45) Date of Patent: May 21, 2002

(54) VALVE TIMING SYSTEM FOR DYNAMICALLY SUPPRESSING CYLINDER KNOCK WITHIN A CAMLESS ENGINE

(75) Inventors: Mazen Hammoud, Dearborn; Imad Hassan Makki, Dearborn Heights; James Michael Kerns, Trenton, all of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/611,868

(22) Filed: Jul. 7, 2000

(51) Int. Cl.[7] ................................. F01L 13/00
(52) U.S. Cl. ................ 123/90.15; 123/90.11; 123/406.29; 123/435
(58) Field of Search ............ 123/90.11, 90.15, 123/90.16, 90.17, 406.29, 435

(56) References Cited

U.S. PATENT DOCUMENTS

| | | |
|---|---|---|
| 4,104,991 A | 8/1978 | Abdoo |
| 5,009,203 A | 4/1991 | Seki |
| 5,022,357 A | 6/1991 | Kawamura |
| 5,072,700 A | 12/1991 | Kawamura |
| 5,117,790 A | 6/1992 | Clarke et al. |
| 5,161,497 A | 11/1992 | Simko et al. |
| 5,255,637 A | 10/1993 | Schechter |
| 5,271,229 A | 12/1993 | Clarke et al. |
| 5,450,824 A | 9/1995 | Yamane et al. |
| 5,469,818 A | 11/1995 | Yoshioka et al. |
| 5,496,229 A | 3/1996 | Miyamoto |
| 5,509,394 A * | 4/1996 | Hitomi et al. ............ 123/559.1 |
| 5,626,109 A | 5/1997 | Yasumura et al. |
| 5,679,094 A | 10/1997 | Nakamura et al. |
| 5,845,613 A | 12/1998 | Yoshikawa |
| 5,964,192 A * | 10/1999 | Ishii ........................ 123/90.11 |
| 6,055,948 A * | 5/2000 | Shiraishi et al. ......... 123/90.15 |

* cited by examiner

Primary Examiner—Wellun Lo
(74) Attorney, Agent, or Firm—Ford Global Tech., Inc.

(57) ABSTRACT

A valve timing system 10 is provided for dynamically suppressing cylinder knock within an internal combustion engine. The engine is of the type including several cylinders 12, each having intake and exhaust valves 14, 16. Valve timing system 10 includes a controller 24, sensors 30, and actuators 26, 28 which selectively actuate valves 14, 16 in response to signals received from controller 24. Controller 24 identifies knocking within one or more of cylinder(s) 12, and provides a modified control signal to the valve actuators 26, 28 which are associated with the identified cylinder(s). The modified control signal alters the duration in which the valves 14, 16 remain open, thereby suppressing knocking within the cylinder(s) without adversely effecting the vehicle's fuel economy or emissions.

18 Claims, 1 Drawing Sheet

VALVE TIMING SYSTEM FOR DYNAMICALLY SUPPRESSING CYLINDER KNOCK WITHIN A CAMLESS ENGINE

FIELD OF THE INVENTION

This invention relates to a valve timing system, and more particularly, to a valve timing system which dynamically and selectively suppresses knocking within the various cylinders of an internal combustion engine.

BACKGROUND OF THE INVENTION

Valve timing systems, arrangements and assemblies are used in internal combustion engines in order to alter the timing of the opening and closing of the engine's intake and/or exhaust valves. Prior valve timing systems typically include one or more camshafts and one or more cam timing assemblies which selectively advance and/or delay the rotation of the one or more camshafts, thereby controlling the actuation of the intake and exhaust valves.

These prior systems and the valve timing profiles used by these systems suffer from several drawbacks. Particularly, due to their inherent physical limitations, these prior cam-driven systems are ineffective to adjust or control valve "overlap" (i.e., situations in which both the intake and exhaust valves are open) during vehicle operation. In order to generate maximum power at high speeds, a relatively high degree of valve overlap is required. However, at low speeds (e.g., at idling conditions) a high degree of valve overlap undesirably causes high emissions and increases the susceptibility to engine knock. Due to the inability of these prior systems to efficiently and dynamically adjust the timing of the valves during different vehicle operating modes, the valve timing profiles or strategies used within these prior systems typically compromise between power output at high engine speeds and proper idling at low engine speeds. As a result, these prior systems generally cannot maximize power and fuel efficiency and minimize emissions at both high and low engine operating speeds. Moreover, these cam-driven systems lack the ability to independently control individual valves during the operation of the vehicle. Hence, these systems cannot dynamically suppress or control harmful conditions such as knocking within the individual cylinders of the engine during operation of the vehicle.

Efforts have been made to increase the efficiency of vehicle engines and reduce emissions by eliminating the camshafts and operating the intake and exhaust valves by use of selectively controllable electromagnetic actuators. These types of systems eliminate many problems related to the physical characteristics of cam-driven systems and offer additional precision in valve timing. However, these prior systems are typically implemented for the purpose of improving fuel economy and emissions and do not address knock control. Thus, these systems suffer from many of the same previously delineated drawbacks associated with cam-driven systems. For example and without limitation, the same valve timing is commanded to each cylinder regardless of the propensity of that cylinder to knock. Consequently, these systems are unable to be selectively and dynamically altered to suppress or control cylinder knocking during the operation of the vehicle. Such systems rely on retarding spark timing in order to suppress knock, coupled with enriching the air-fuel mixture in severe knocking conditions. Both of these measures result in undesirably increasing emissions and fuel consumption. With the present invention, valve timing is altered to respond to knock by reducing the amount of mixture drawn into the knocking cylinder, and thus air-fuel ratios and spark timing are maintained at optimum levels for fuel economy and emissions.

There is therefore a need for a new and improved valve timing system for use with a camless engine which dynamically suppresses knocking within the individual cylinders of the engine without adversely effecting fuel economy and emissions.

SUMMARY OF THE INVENTION

It is a first object of the invention to provide a valve timing system which overcomes at least some of the previously delineated drawbacks of prior valve timing systems, assemblies and methodologies.

It is a second object of the invention to provide a valve timing system for use in combination with a camless internal combustion engine which dynamically suppresses knocking within the various cylinders of the engine.

It is a third object of the invention to provide a valve timing system for use within an engine which utilizes several electromagnetic valve actuating assemblies which are dynamically and independently controlled to suppress cylinder knocking while the engine is operating without having to alter the air-fuel ratio and spark timing from optimum levels for fuel economy and emissions.

According to a first aspect of the present invention, a valve timing system is provided for use within a camless engine of the type including a cylinder having at least one valve. The valve timing system includes at least one actuator which selectively actuates the at least one valve; a sensor which is effective to detect knocking within the cylinder, and to generate a first signal in response to the detection; and a controller which is communicatively coupled to the at least one actuator and to the sensor, the controller being effective to receive the signal and to selectively communicate a second signal to the at least one actuator, the second signal having a value based upon the first signal and being effective to cause the at least one actuator to alter the actuation of the at least one valve while the engine is operating, thereby dynamically suppressing the knocking within the cylinder.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
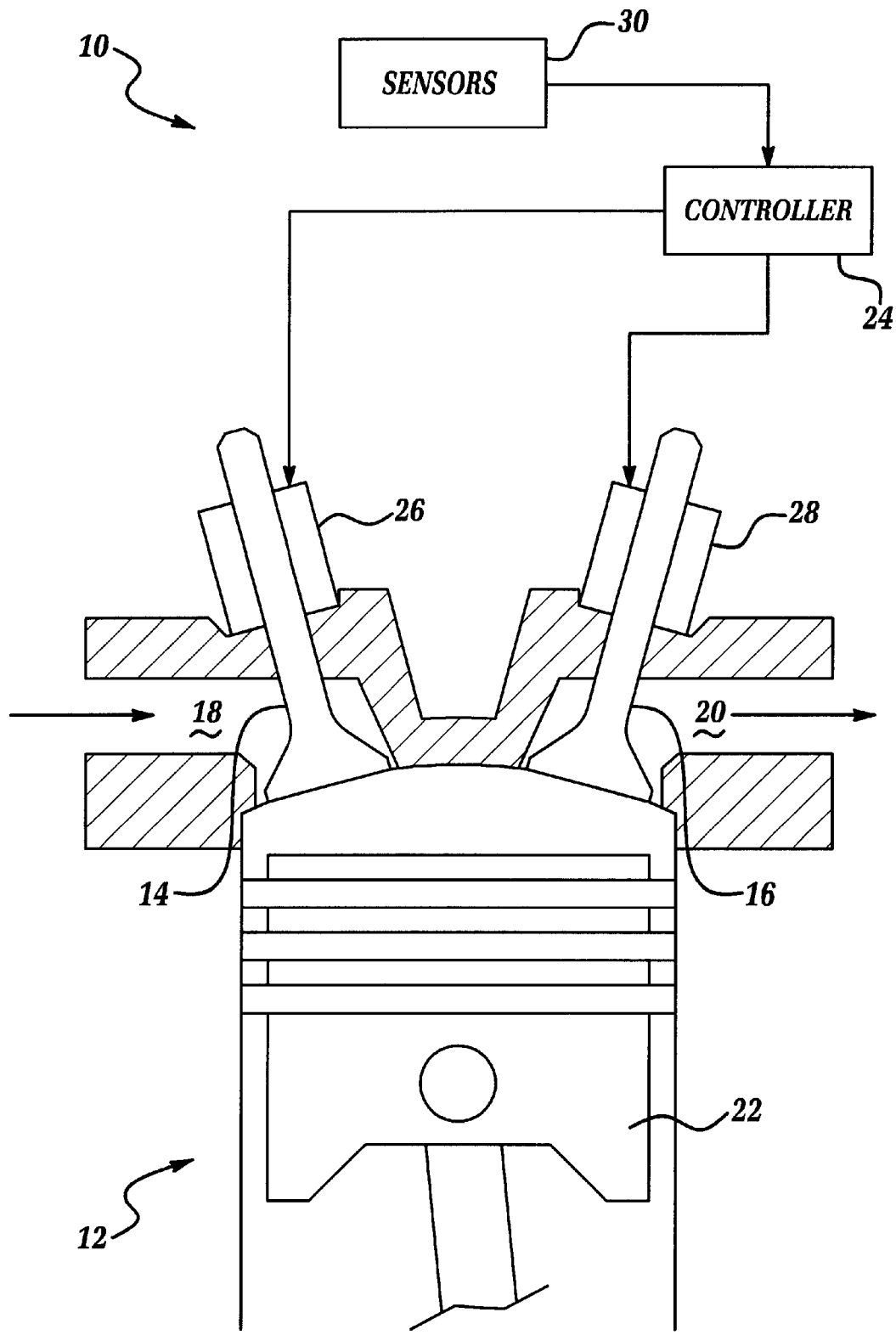
FIG. 1 is a schematic view of a valve timing system, which is made in accordance with the teachings of the preferred embodiment of the invention.

Referring now to FIG. 1, there is shown a valve timing system or assembly 10 which is made in accordance with the teachings of the preferred embodiment of the invention and which is adapted for use in combination with an internal combustion engine of the type having several substantially identical cylinders 12. Each cylinder 12 includes at least one intake valve 14 which selectively delivers an air and fuel mixture to cylinder 12 through intake port 18, at least one exhaust valve 16 which selectively discharges exhaust gasses from the cylinder 12 through discharge port 20, and a conventional piston 22 which is slidably disposed within cylinder 12.

System 10 includes a valve control unit or controller 24, a pair of actuators 26, 28 which are each electrically and communicatively coupled to controller 24, and sensors 30 which are electrically and communicatively coupled to controller 24. As discussed more fully and completely below, controller 24 determines which valves are to be actuated (i.e., opened), when the respective valves are to be actuated, and the duration of time for which the respective valves are to be actuated according to a certain valve timing strategy or profile. When cylinder knocking occurs, controller 24 receives signals generated by sensors 30 in response to the detected knocking, and alters the valve timing within the knocking cylinder(s) 12, thereby suppressing the knocking. The engine's air-fuel ratio and spark timing are kept at optimum levels for fuel economy and emissions.

In the preferred embodiment, controller 24 is a conventional controller including one or more microprocessors which cooperatively perform the below-described processes. In one alternate embodiment, controller 24 comprises a portion of a conventional engine control unit ("ECU"). In other alternate embodiments, controller 24 is externally coupled to the engine control unit. In such embodiments, the engine control unit receives signals from sensors 30 and communicates the received signals to controller 24. Controller 24 includes one or more stored valve timing strategies or profiles which it uses to control the timing of valves 14, 16 under normal operating conditions (i.e., when knocking has not been detected within cylinders 12).

Sensors 30 comprise conventional and commercially available vehicle operating condition sensors, which may include without limitation one or more conventional engine block-mounted knock sensors or other types of sensors which are capable of detecting knocking within any of cylinders 12. Sensors 30 are effective to measure or detect engine operating attributes or conditions (e.g., engine noise and/or vibrations) and to selectively generate and communicate signals to controller 24 (and/or to an engine control unit) representing the measured or detected attributes or conditions. For example and without limitation, sensors 30 are effective to sense or detect engine noise or vibration and to communicate signals to controller 24 which compares the received signals to a signal resulting from smooth (i.e., "knock-less") combustion in order to determine whether knocking is present within any of cylinders 12. In one non-limiting embodiment, the signals provided by sensor 30 are also effective to represent the severity of the knocking and the identity of the cylinder(s) in which knocking is detected. Based on this received data, controller 24 selectively alters the opening and closing of valves 14, 16 by use of actuators 26, 28 in a manner effective to suppress knocking within the cylinder(s) 12, as described below.

In the preferred embodiment, actuators 26, 28 are conventional electromagnetic or electrohydraulic valve actuators that are effective to receive signals from controller 24 and to actuate valves 14, 16 in response to the received signals. Actuators 26, 28 actuate or hold valves 14, 16 open for a certain duration or period of time which is based upon the values of the signals received from controller 24. By controlling the length duration of time for which valves 14, 16 are open, controller 24 may respectively control the amount of air and fuel that is introduced into cylinder 12 and the amount of residual gas which remains within cylinder 12 after a firing event. It should be appreciated that in multi-cylinder engines, a unique actuator 26, 28 is utilized for each of the valves 14, 16 and each of the actuators 26, 28 is independently coupled to controller 24. In this manner, each of valves 14, 16 may be selectively and independently controlled by controller In the preferred embodiment, system 10 may further include other conventional knock controlling and/or suppression systems which operate in combination with system 10, such as systems that control and alter the ignition timing of the engine in response to a detected knocking in one or more of cylinders 12.

In operation, when controller 24 determines that a knocking condition has occurred or is occurring within one of cylinders 12 (e.g., when the data received from sensors 30 indicates that knocking has occurred within one of cylinders 12), controller 24 identifies the cylinder(s) 12 in which knocking has been detected. This "cylinder" identification is performed by processing the signal received from sensor 30 in a conventional manner. Once controller 24 has identified the "knocking" cylinder(s), controller 24 interrupts the current valve timing profile or strategy stored within controller 24 for the "knocking" cylinder(s), and provides a modified control signal to the specific valve actuators 26, 28 which are associated with the "knocking" cylinder(s).

In one non-limiting embodiment, the modified control signal is effective to alter the duration of time that valves 14, 16 remain in an actuated or opened position, and/or the time that the valves are actuated relative to each other (e.g., valve "overlap"), and/or relative to the stroke of piston 22. In one non-limiting embodiment, controller 24 selectively reduces the amount of air and fuel (i.e., the "air charge mass") that is introduced into the cylinder 12 in order to suppress knocking within the cylinder 12. Particularly, controller 24 communicates a signal to actuator 26 effective selectively shorten the duration or period of time that valve 14 remains actuated (i.e., open). This shortened actuation of valve 14 reduces the amount of air and fuel that is introduced into the cylinder 12, thereby suppressing knocking within the cylinder 12. The amount of time that the actuation is shortened may be based on the severity of the detected knocking. System 10 achieves this suppression dynamically, while the vehicle is operating and without effecting the valve timing within the other properly operating cylinders.

Additionally, controller 24 can likewise suppress knocking within cylinder 12 by selectively altering the amount of residual gas that remains within cylinder 12 after a firing event. Particularly, controller 24 communicates a signal to actuator 28 effective to selectively alter the duration or period of time that valve 16 remains actuated (i.e., open), thereby selectively altering the amount of the residual gas within the cylinder 12 and suppressing knocking within the cylinder. In one non-limiting embodiment, the signal sent to actuator 28 lengthens the duration of time that valve 16 remains actuated, thereby reducing the residual gas within the cylinder, and suppressing knocking within the cylinder. The amount of time that the actuation is altered may be based on the severity of the sensed knocking. This suppression also occurs dynamically, while the vehicle is operating and without effecting the valve timing within the other properly operating cylinders. Once the knocking has been suppressed, controller 24 resumes the valve timing profile or strategy for the identified cylinder(s) 12.

In this manner, the system 10 is able to selectively and dynamically suppress knocking within particular cylinders 12 of an internal combustion engine, while the vehicle is operating and without effecting the timing strategy or profile of the other cylinders. Furthermore, the present system provides this dynamic suppression without altering the fuel ratio or spark timing, which remain at optimum levels for fuel economy and emissions.

It is to be understood that the invention is not to be limited to the exact construction and/or method which has been illustrated and discussed above, but that various changes and/or modifications may be made without departing from the spirit and the scope of the invention.

What is claimed is:

1. A valve timing system for use within an internal combustion engine of the type including a plurality of cylinders each having at least one valve, said valve timing system comprising:

at least one actuator which selectively actuates said at least one valve;

a sensor which is effective to detect knocking within a unique one of said plurality of cylinders, and to generate a first signal in response to said detection; and a controller which is communicatively coupled to said at least one actuator and to said sensor, said controller being effective to receive said signal and to selectively communicate a second signal to said at least one actuator corresponding to said knocking cylinder, said second signal having a value based upon said first signal and being effective to cause said at least one actuator to alter the actuation of said at least one valve while said engine is operating, thereby dynamically suppressing said knocking within said cylinder.

2. The valve timing system of claim 1 wherein said at least one actuator comprises an electromagnetic actuator.

3. The valve timing system of claim 1 wherein said at least one valve comprises an intake valve.

4. The valve timing system of claim 3 wherein said at least one valve further comprises an exhaust valve.

5. The valve timing system of claim 3 wherein said at least one actuator is effective to actuate said intake valve for a certain duration of time in which a certain amount of air and fuel enters said cylinder and wherein said controller is effective to selectively shorten said certain duration of time, thereby reducing said certain amount of air and fuel and suppressing said knocking.

6. The valve timing system of claim 4 wherein said at least one actuator is effective to actuate said exhaust valve for a certain duration of time effective to cause a certain amount of residual gas to remain within said cylinder and wherein said controller is effective to selectively lengthen said certain duration of time, thereby reducing said certain amount of residual gas and suppressing said knocking.

7. The valve timing system of claim 1 wherein said controller comprises a portion of an engine control unit.

8. A method for suppressing knocking within an engine of the type including a plurality of cylinders each having at least one valve which is actuated according to a certain timing profile, said method comprising the steps of:

detecting knocking within a unique one of said plurality of cylinders; and selectively altering said timing profile of said at least one valve corresponding to said knocking cylinder while said engine is operating, thereby dynamically suppressing said knocking within said cylinder.

9. The method of claim 8 wherein said knocking is detected by use of a sensor.

10. The method of claim 9 wherein said at least one valve comprises an intake valve.

11. The method of claim 10 wherein said timing profile is effective to actuate said intake valve for a certain duration of time in which a certain amount of air and fuel enters said cylinder and wherein said step of altering said timing profile comprises selectively shortening said certain duration of time, thereby reducing said certain amount of air and fuel and suppressing said knocking.

12. The method of claim 9 wherein said at least one valve further comprises an exhaust valve.

13. The method of claim 12 wherein said timing profile is effective to actuate said exhaust valve for a certain duration of time effective to cause a certain amount of residual gas to remain within said cylinder and wherein said step of altering said timing profile comprises selectively lengthening said certain duration of time, thereby reducing said certain amount of residual gas and suppressing said knocking.

14. A method for valve timing for use within an internal combustion engine of the type including a plurality of cylinders each having at least one valve, said method comprising the steps of:

providing at least one actuator which selectively actuates said at least one valve;

providing a sensor which is effective to detect knocking within a unique one of said plurality of cylinders, and to generate a first signal in response to said detection;

receiving said signal; and causing said at least one actuator corresponding to said knocking cylinder to dynamically alter the actuation of said at least one valve based upon said received signal, thereby suppressing said knocking within said cylinder.

15. The method of claim 14 wherein said at least one valve comprises an intake valve.

16. The method of claim 15 wherein said at least one actuator is effective to actuate said intake valve for a certain duration of time in which a certain amount of air and fuel enters said cylinder and wherein said step of causing said at least one actuator to dynamically alter the actuation of said at least one valve based upon said received signal comprises selectively shortening said certain duration of time, thereby reducing said certain amount of air and fuel and suppressing said knocking.

17. The method of claim 16 wherein said at least one valve further comprises an exhaust valve.

18. The method of claim 17 wherein said at least one actuator is effective to actuate said exhaust valve for a certain duration of time effective to cause a certain amount of residual gas to remain within said cylinder and wherein said step of causing said at least one actuator to dynamically alter the actuation of said at least one valve based upon said received signal comprises selectively lengthening said certain duration of time, thereby reducing said certain amount of residual gas and suppressing said knocking.

* * * * *